United States Patent
Zoloto et al.

(10) Patent No.: US 10,207,187 B2
(45) Date of Patent: Feb. 19, 2019

(54) MULTI-PLAYER GAMING SOUND SYSTEM

(71) Applicant: Bally Gaming, Inc., Las Vegas, NV (US)

(72) Inventors: Steven J. Zoloto, Highland Park, IL (US); Joseph Gordon Marcus, Buffalo Grove, IL (US); Edward G. Brunell, Chicago, IL (US); Michael P. Connelly, Mount Prospect, IL (US); Nicholas Matthew Garoufalis, Chicago, IL (US); Timothy C. Loose, Chicago, IL (US)

(73) Assignee: Bally Gaming, Inc., Las Vegas, NV (US)

( * ) Notice: Subject to any disclaimer, the term of this patent is extended or adjusted under 35 U.S.C. 154(b) by 0 days.

(21) Appl. No.: 15/702,329

(22) Filed: Sep. 12, 2017

(65) Prior Publication Data

US 2018/0071631 A1    Mar. 15, 2018

Related U.S. Application Data

(60) Provisional application No. 62/394,361, filed on Sep. 14, 2016.

(51) Int. Cl.
| | |
|---|---|
| *A63F 13/00* | (2014.01) |
| *A63F 13/54* | (2014.01) |
| *A63F 13/25* | (2014.01) |
| *G07F 17/32* | (2006.01) |
| *A63F 13/80* | (2014.01) |
| *H04S 7/00* | (2006.01) |

(52) U.S. Cl.
CPC .............. *A63F 13/54* (2014.09); *A63F 13/25* (2014.09); *A63F 13/80* (2014.09); *G07F 17/3244* (2013.01); *G07F 17/3293* (2013.01); *H04S 7/303* (2013.01)

(58) Field of Classification Search
CPC ............. G07F 17/3211; G07F 17/3216; G07F 17/3232; G07F 17/3234; G07F 17/3236; A63F 13/54; A63F 2300/6063; A63F 2300/6081; H04S 7/303
See application file for complete search history.

(56) References Cited

U.S. PATENT DOCUMENTS

| | | | |
|---|---|---|---|
| 7,699,704 B2 | 4/2010 | Suzuki et al. | |
| 8,172,677 B2 * | 5/2012 | Bleich | G07F 17/3218 463/30 |
| 8,851,990 B2 | 10/2014 | Steil | |
| 8,864,584 B2 | 10/2014 | Radek et al. | |
| 8,932,134 B2 | 1/2015 | Andall | |
| 2004/0110561 A1 * | 6/2004 | Kawamura | A63F 13/10 463/35 |
| 2004/0142739 A1 | 7/2004 | Loose et al. | |
| 2004/0229683 A1 | 11/2004 | Mothwurf et al. | |
| 2005/0164762 A1 * | 7/2005 | Smith | G07F 17/32 463/16 |

(Continued)

*Primary Examiner* — Lawrence Galka
(74) *Attorney, Agent, or Firm* — David J. Bremer; Marvin A. Hein

(57) ABSTRACT

A sound system presenting audio that supplements multi-player game-play in which multiple views of a 3D game object as seen from different viewpoints are simultaneously displayed. The audio includes audio characteristics responsive to behaviors of the 3D game object and depict a focus direction associated with respective behaviors.

20 Claims, 11 Drawing Sheets

(56) References Cited

U.S. PATENT DOCUMENTS

| | | | | |
|---|---|---|---|---|
| 2005/0164787 A1* | 7/2005 | Connelly | ............... | G07F 17/32 463/35 |
| 2006/0068909 A1* | 3/2006 | Pryzby | ................... | G07F 17/32 463/35 |
| 2008/0070685 A1* | 3/2008 | Pryzby | ................... | G07F 17/32 463/35 |
| 2008/0214262 A1* | 9/2008 | Phillips | .................. | G07F 17/32 463/16 |
| 2009/0298579 A1* | 12/2009 | Radek | ................... | G07F 17/32 463/25 |
| 2010/0048275 A1* | 2/2010 | Yoshizawa | ............. | G07F 17/32 463/12 |
| 2010/0298051 A1* | 11/2010 | Loose | .................... | G07F 17/32 463/35 |
| 2011/0201407 A1* | 8/2011 | Munakata | ............... | G07F 17/32 463/22 |
| 2013/0267319 A1* | 10/2013 | Kuhn | .................. | G07F 17/3211 463/34 |
| 2014/0357368 A1 | 12/2014 | Taylor et al. | | |
| 2018/0050273 A1* | 2/2018 | Garoufalis | ............ | A63F 13/525 |

* cited by examiner

MULTI-PLAYER GAMING SOUND SYSTEM

RELATED APPLICATIONS

This patent application claims the benefit of priority to U.S. Provisional Patent Application Ser. No. 62/394,361 filed on 14 Sep. 2016 and entitled "Multi-Player Gaming Sound System," the contents of which are hereby incorporated by reference in their entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2017, Bally Gaming, Inc.

FIELD OF THE INVENTION

The present invention relates generally to gaming systems, apparatus, and methods and, more particularly, to audio presentations for multi-player gaming.

BACKGROUND OF THE INVENTION

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Additionally, there exists the technical challenge to push the envelope of familiar gaming apparatus and games played thereon by employing technological components in unconventional ways to present the advanced graphics, enhanced audio presentations, and innovative game formats to a wider audience, measured in both variety and numbers. Expanding game play of the current generation of innovative games to multiple players and augmenting its presentation beyond a standalone EGM or bank of EGMs may enhance both the financial viability of the gaming industry and the entertainment value of the gaming experience. For example, when multi-player games are conducted via electronic display devices (as opposed to conventional table-type games with a live dealer/croupier/boxman), game play may become repetitive and lifeless due in part to the homogeneity of the programmed visual and audio presentations. One approach to providing a greater range of interactive game-play situations would be to increase the number of stored game-play scenarios—such as different viewpoints of each event for each individual player. Even if this approach did not present any insurmountable technical hurdles, the higher development costs, increased memory storage requirements, and heavy processing overhead required to create and execute separate game-play scenarios for each player (or position) may be prohibitively expensive. However, the instant invention overcomes these constraints by augmenting the variety and distinctiveness of the individual player interactions without significantly increasing the storage requirements necessary to operate the game amongst the multiple players.

As the industry matures, the creativity and ingenuity required to improve such operation of gaming apparatus and games grows accordingly.

SUMMARY OF THE INVENTION

According to one aspect of the present invention, a gaming system configured to present images of a 3D game object displaying behaviors having various focus directions comprises a plurality of audio output devices and audio-processing circuitry. In response to the 3D game object behavior having a first focus direction, the audio-processing circuitry is configured to output principal audio to a first position of multiple positions that is proximal the first focus direction. Also, the audio-processing circuitry is configured to output subordinate audio to a second position that is distal to the first focus direction. The principal audio has characteristics that depict proximity of the first position to the first focus direction and the subordinate audio has characteristics that depict distality of the second position to the first focus direction.

According to another aspect of the invention, a method of supplementing a display of images of a 3D game object with audio is disclosed. The 3D game object displays varying behaviors having respective focus directions with respect to multiple positions around a reflective display assembly. The method comprises, in response to the 3D game object behavior having a first focus direction, outputting first-position audio at a first position that is proximal the first focus direction. The first-position audio has characteristics that depict proximity of the first position to the first focus direction. Also, the method comprises outputting second-position audio at a second position that is distal the first focus direction, and the second-position audio has characteristics that depict distality of the second position from the first focus direction.

Further, in response to the 3D game object behavior shifting from the first focus direction to a second focus direction, the method adjusts the second position audio so that the second position audio characteristics depict proximity of the second position to the second focus direction and adjusts the first position audio so that the first position audio characteristics depict distality of the first position to the second focus direction.

According to still another aspect of the invention, a method of supplementing a reflective display assembly with audio comprises, in response to a 3D game object displayed by the reflective display assembly interacting with a player at a first position of multiple positions disposed around the reflective display assembly, outputting principal audio at the first position. The principal audio has characteristics that signify the interaction between the 3D game object and the player. Further, the method outputs subordinate audio at a second position of the multiple position. The subordinate audio has characteristics that signify non-interaction between the 3D game object and a player at the second position.

Additional aspects of the invention will be apparent to those of ordinary skill in the art in view of the detailed description of various embodiments, which is made with reference to the drawings, a brief description of which is provided below.

Figure 1:
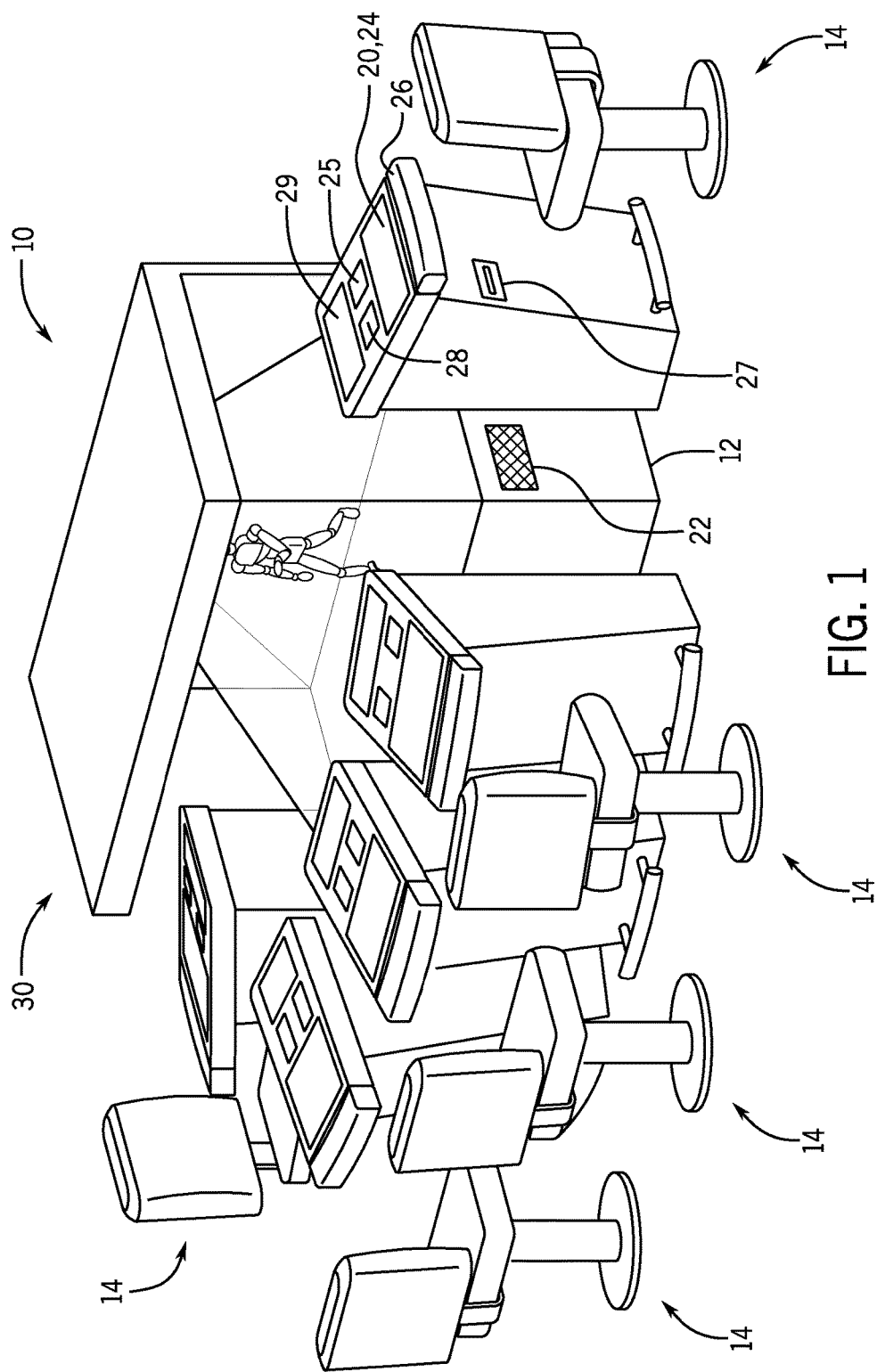
FIG. 1 is a perspective view of a free-standing multi-player gaming machine according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

The invention is a sound system for multi-player games that are presented to respective players at discrete positions and include individualized visual presentations tailored to the different positions. One example of such a multi-player presentation is provided by the gaming machine 10 depicted in FIG. 1, and details related to the embodiment of FIG. 1 are provided below for example only and do not limit applications of the invention. Sound components and configuration/operation specifics related to the invention are disclosed separately from the basic operational description of gaming machine 10. Basic components such as the one or more speakers 22 shown in FIG. 1 may be separate from the implementation of the invention or may be incorporated as constituents of a sound system according to an embodiment of the invention. It is understood by those having ordinary skill in the gaming arts that other presentation systems and apparatus may be similarly enhanced by embodiments of the invention, and these and other presentation systems are considered to be within the scope of the invention.

Referring again to FIG. 1, there is shown a gaming machine 10 configured for operation in gaming establishments, such as casinos. In the context of the present invention, the gaming machine 10 may be any type of gaming terminal or machine and may have varying structures and methods of operation. For example, in some aspects, the gaming machine 10 is a multi-player gaming terminal configured to play a video casino game, such as slots, keno, poker, blackjack, roulette, craps, etc. The gaming machine 10 may take any suitable form, such as floor-standing multi-player station as shown, a surrounded centerpiece display, stadium-style game stage, etc. Further, the gaming machine 10 may be primarily dedicated for use in playing wagering games, or may include non-dedicated devices, such as mobile phones, personal digital assistants, personal computers, etc.

The gaming machine 10, and other embodiments of the invention, utilize a reflective display assembly 30 to entertain and communicate with multiple players arrayed around the display assembly using a pseudo-holographic image of a 3D game object reflected in a plurality of reflectors. The reflective display assembly depicts the 3D game object from various viewpoints simultaneously so that an observer at one position sees a different (and positionally appropriate) viewpoint than another observer at a different position. The novel application of the reflective display technology combined with innovative 3D game-play elements engages the players individually and collectively through focused interactions via the pseudo-holographic visual presentation.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 may be considered to include a plurality of player stations such as player station 14, and one or more components of the gaming machine 10 described herein may reside in one or more player stations 14. Such a distribution of components is understood to be within the scope of a gaming machine 10. A notification mechanism, such as a candle or tower light, may be mounted to the top of the cabinet 12. It flashes to alert an attendant that change is needed, a hand pay is requested, or there is a potential problem with the gaming machine 10.

The input devices, output devices, and input/output devices may be disposed on, and/or securely coupled to, the cabinet 12 and/or the player stations 14. By way of example, the output devices include a primary reflective display assembly 30, one or more secondary displays 20 (mounted to the player stations, in an embodiment), and one or more audio speakers 22. The secondary display 20 may be a mechanical-reel display device, a video display device, or a combination thereof. In an embodiment, a transmissive video display is disposed in front of the mechanical-reel display to portray a video image superimposed upon a mechanical-reel display. Also, a secondary display may be a community display mounted for visibility to a plurality of players/observers. The display(s) variously presents information and images associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the secondary display(s) 20, buttons 26 on a button panel, a bill/ticket acceptor 28, a card reader/writer 25, a ticket dispenser 27, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device 29, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 may include one or more value input/payment devices and value output/payout devices. In order to deposit cash or credits onto the gaming machine 10, the value input devices are configured to detect a physical item associated with a monetary value that establishes a credit balance on a credit meter such as a "credits" meter. The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 25, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84, the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 25, the ticket dispenser 27 for printing tickets redeemable for cash or credits, a wireless communication interface for transmitting cash or credit data to a nearby mobile device, and a network interface for depositing cash or credits to a remote account via an electronic funds transfer.

Figure 2:
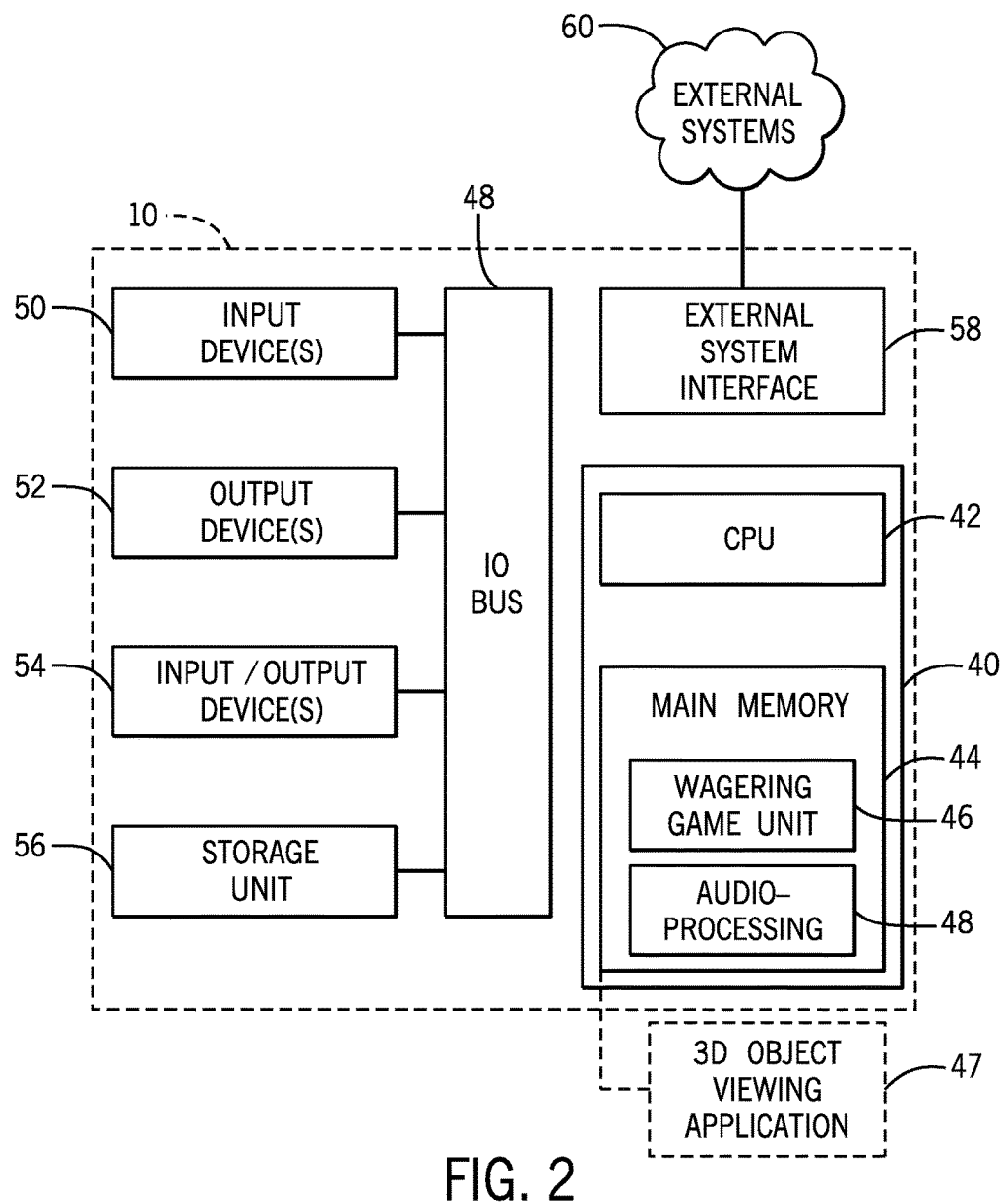
FIG. 2 is a schematic view of a gaming system according to an embodiment of the present invention.

Referring to FIG. 2, there is shown a block diagram of an embodiment of gaming-machine architecture. The gaming machine 10 includes game-logic circuitry 40 including a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video black jack, video slots, video lottery, etc., in whole or part.

The game-logic circuitry 40 is also connected to an input/output (I/O) bus 48, which can include any suitable bus technologies, such as an AGTL+frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

As shown in FIG. 2, the main memory 44 also includes an audio-processing unit 47. In this configuration, one or more of the architectural elements of the gaming machine 10 may be employed as audio-processing circuitry when called for by the audio-processing unit. For example, when the audio-processing unit executes (via the CPU 42) audio-processing instructions, signals may be transmitted through the I/O bus 48 to/from input devices 50, output devices 52, input/output devices 54, and the storage unit 56. In an alternative embodiment, the audio-processing unit and associated circuitry may be configured as an external system or as a combination of external devices and internal components.

The game-logic circuitry 40 may further include a 3D object-viewing application 47 configured to provide images of a 3D object seen from a plurality of different viewpoints. The 3D object-viewing application 47 may comprise executable instructions residing in main memory 44 or may comprise a separate component accessed as part of an external system (described below). The 3D object-viewing application 47 may interact with an independent 3D rendering module to capture images from virtual cameras proximate a 3D object in a virtual environment. The virtual cameras may capture dynamic real-time or near-real-time images of the 3D object as it is manipulated by the 3D rendering module. In an embodiment, the 3D object-viewing application includes a resident 3D rendering module and dedicated memory storage in which the 3D object files and supporting data reside. Some 3D object-viewing applications may allow creation of "virtual microphones" that can be positioned within virtual embodiment. In a similar fashion as the virtual cameras, the virtual microphones may process audio signals or files to depict the directional, positional and environmental qualities of the virtual environment. Information generated by the 3D object-viewing application may be utilized by the invention to produce or modify audio output at various positions disposed around the gaming machine. In an embodiment, the 3D object-viewing application may be a commercially available software application such as a Unity® product from Unity Technologies.

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. Similarly, the player stations 14 may operate as thin, thick, or intermediate clients to the gaming machine 10. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

In accord with various methods of conducting an exemplary game on a gaming system in accord with the present concepts, the game includes a game sequence in which a player makes a wager and a game outcome is provided or displayed in response to the wager being received or detected. The game outcome, for that particular game instance, is then revealed to the player in due course following initiation of the game. The method comprises the acts of conducting the game using a gaming apparatus, such as the gaming machine 10 depicted in FIG. 1, following receipt of an input from the player to initiate a game instance. The gaming machine 10 then communicates the game outcome to the player via one or more output devices (e.g., reflective display assembly 30 or secondary display 20) through the display of information such as, but not limited to, text, graphics, static images, moving images, etc., or any combination thereof. In accord with the method of conducting the game, the game-logic circuitry 40 transforms a physical player input, such as a player's pressing of a "DRAW" touch key, into an electronic data signal indicative of an instruction relating to the game (e.g., an electronic data signal bearing data).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the game, causes the primary display 30, other display device, or other output device (e.g., speakers, lights, communication device, etc.) to change from a first state to at least a second state, wherein the second state of the output device comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random outcome.

In one embodiment, the gaming machine 10 and, additionally or alternatively, the external system 60 (e.g., a gaming server), comprises gaming equipment that meets the hardware and software requirements for fairness, security, and predictability as established by at least one state's gaming control board or commission. Prior to commercial deployment, the gaming machine 10, the external system 60, or both and the casino game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

Referring once more to the embodiment shown in FIG. 1, the gaming machine 10 may conduct a multi-player game with players around the reflective display assembly 30, and display elements of the game both to players seated at the player stations 14 and to observers (or players) positioned around the player stations in view of the display assembly 30. Various games, bonus features, and game-types may be presented in conjunction with the gaming machine 10. Casino card games such as poker, blackjack, pai gow, and baccarat, to name only a few, can be presented to a multi-player audience via implementation on the display assembly 30 and/or other display devices to engage the players. Table games like roulette and craps may similarly benefit from the presentation capabilities of the gaming machine 10. Other card games, dice games, video wagering games, etc. may be successfully adapted to presentation via the gaming machine 10 and other embodiments.

In an exemplary game, such as a poker game, the reflective display assembly provides a pseudo-holographic image of a 3D virtual dealer. The dealer appears to be facing an observer from the front-mounted reflector. From the other two reflectors (e.g., the right and left sides), the dealer is seen from either the right or left side, respectively. As game-play moves from one position to another, the dealer may turn to their left or right to deal cards or to address one or more players at the respective player stations. As such, players may feel individually engaged by the virtual dealer as if they were participating in a table game with a human dealer. Dealt cards may be visible on the secondary display 20 and/or on the reflectors of the reflective display assembly. In an embodiment, game elements of a base game are displayed on the secondary display 20 and bonus game elements are displayed on the reflective display assembly 30.

Figure 3:
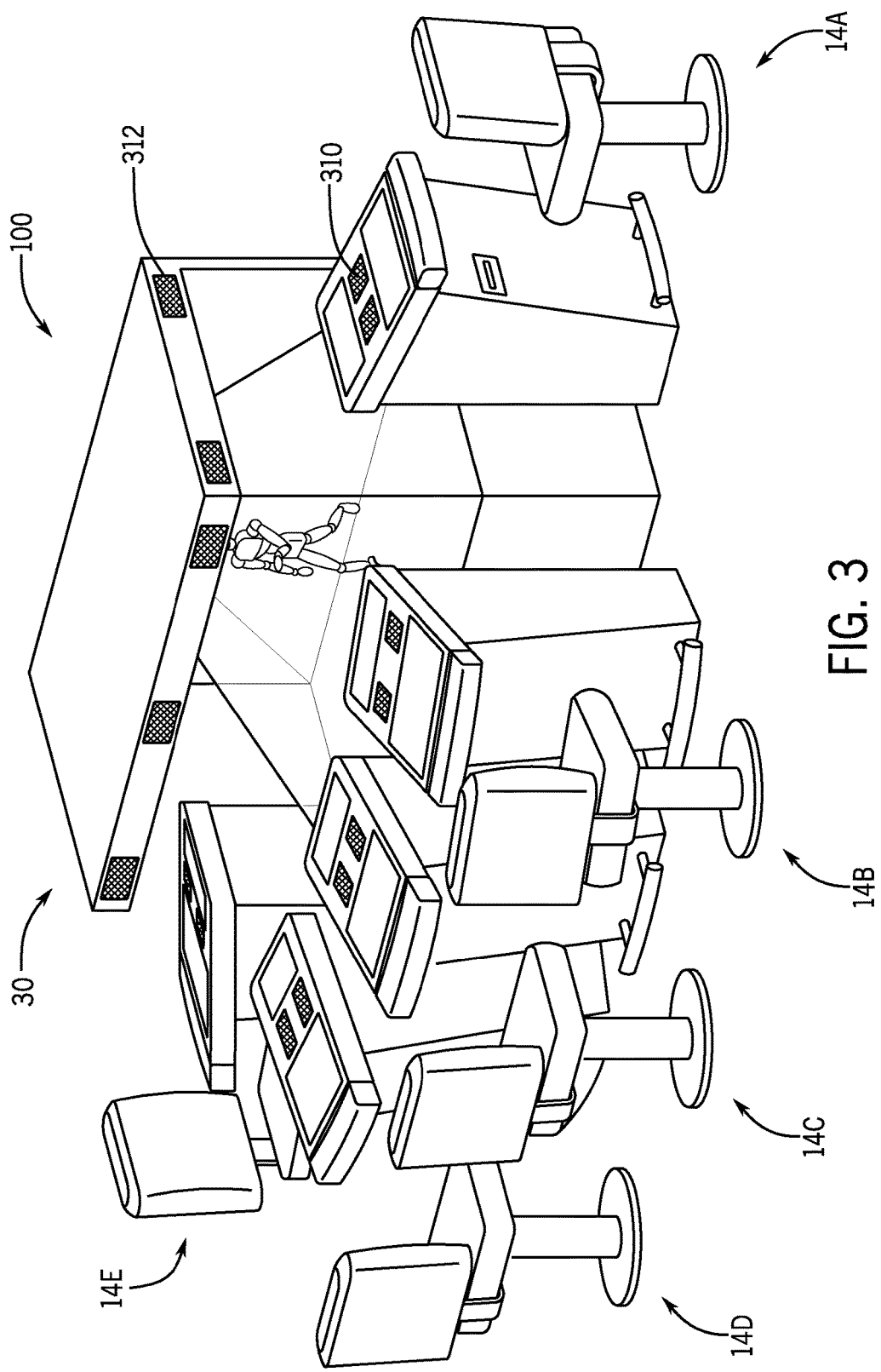
FIG. 3 is a perspective view of a free-standing multi-player gaming machine including sound components according to an embodiment of the present invention.

Referring now to FIG. 3, there is shown a gaming machine 100 adapted to include sound system components for implementing an embodiment of the invention. Gaming machine 100 may comprise any or all features previously discussed with regard to gaming machine 10 shown in FIGS. 1 and 2. Here and throughout, references to gaming machines 10 and 100 may be interpreted to be configured according to embodiments of the current invention. Gaming machine 100 includes player stations 14A-E disposed around the reflective display device 30 and each player station is equipped with audio speakers such as speakers 310. Additionally, the reflective display assembly 30 is shown to include supplementary speakers 312. It is understood that either speakers 310 or speakers 320 are merely exemplary components and may be included or deleted, and/or repositioned in various configurations. Player station-specific speakers 310 may be effective for focusing audio output at the respective stations, however, similar effects may be achieved by selective outputs at supplementary speakers 312. Alternatively, supplementary speakers 312 may output ambient or common audio intended for all positions while player station-specific speakers 310 output audio that is specifically targeted for particular positions. Ambient sounds may comprise applause, cheering, conversation, and celebration sounds associated with a prototypical casino environment. And, speakers 312 and 310 may output audio including a combination of common and targeted sounds.

Directional or positional audio targeting (aiming sounds to a particular region or direction) is known to be achieved by various means including phase manipulation or cancelling, directional reflectors, dipole speakers, psychoacoustic audio processing, etc., and such targeting is not the focus of the current invention, although it may be employed in conjunction with the inventive aspects of the invention.

In an embodiment of the invention, a sound system including audio-processing circuitry and one or more audio output devices (e.g., speakers) is logically linked to the game-logic circuitry conducting the game on gaming machine 10. The sound system may be integrated into the gaming machine architecture, may be configured as an external system connected for communication to the gaming machine 10, or may be a combination of internal and external components. As the gaming machine 100 presents the 3D game object on the reflective display assembly 30, the sound system provides position-specific audio outputs responsive to behaviors of the 3D game object during game-play.

Figure 4:
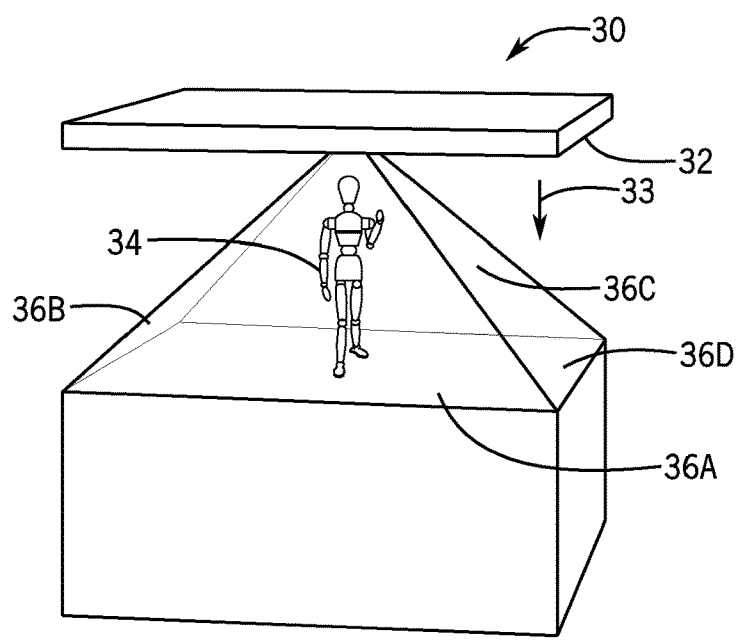
FIG. 4 is a perspective view of a reflective display assembly according to an embodiment of the present invention.

Referring now to FIG. 4, there is shown an exemplary reflective display assembly 30 such as may be used in the gaming machine 10 of FIG. 1 and in gaming machine 100 of FIG. 3. The reflective display assembly 30 includes a primary display device 32 with its screen facing in a downward display direction 33 in this embodiment. Below the primary display device 32 along the display direction 33, the display assembly 30 includes a plurality of reflectors 36A-D arranged in a four-sided pyramidal configuration with each reflector 36A-D positioned at an oblique angle (i.e., neither a right angle nor a multiple of a right angle) to the display direction 33. The reflectors 36A-D are shown angled approximately 45 degrees from the display direction 33, but reflectors may be positioned at other oblique angles. The display device 32 is positioned with its center point substantially incident with the theoretical apex of the pyramid. In an embodiment, the display device 32 may be configured with its screen facing in an upward direction or in another direction. In any case, the plurality of reflectors will be positioned proximal to the display device and along the display direction. A reflector may comprise various materials that reflect at least some incident light.

The display device 32 may include a single display screen. Alternatively, the display device 32 may comprise a plurality of separate screens. In an embodiment, the display device includes four separate display screens positioned adjacently to comprise the total screen area. Multiple display screens may be controlled by common display circuitry and may be controlled separately by respective display circuitry.

In a configuration, any image displayed on the display device 32 will be at least partially reflected outwards from the display direction 33 by one or more of the plurality of reflectors 36A-D, depending on a position of the image on the screen. In FIG. 4, the reflected image of the 3D game object 34 is visible on the reflector 36A (and also reflected by, but not shown in FIG. 4, on reflectors 36B-D).

Figure 5:
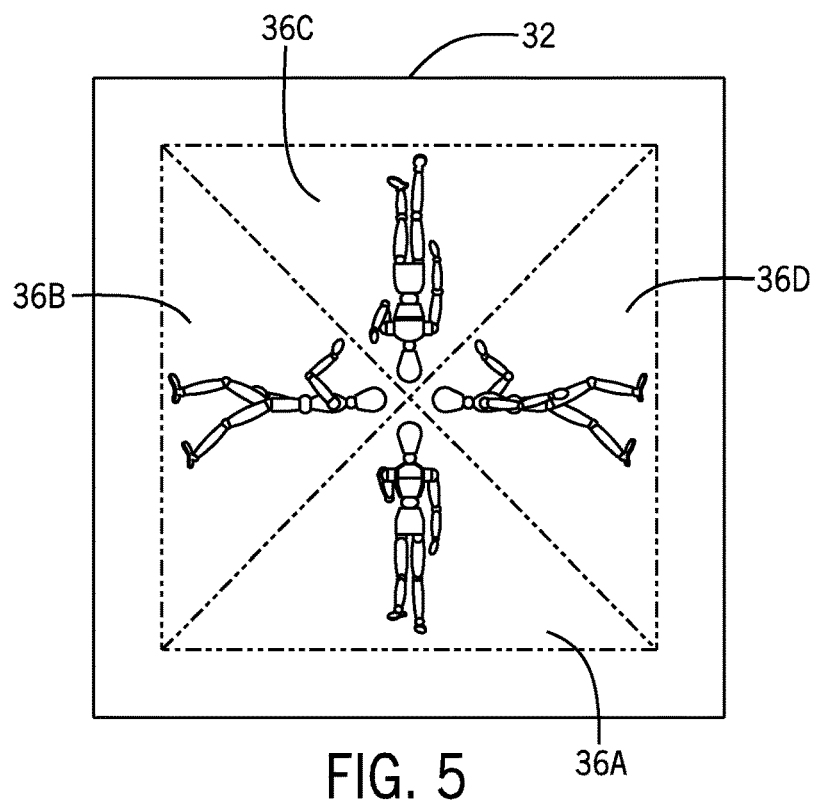
FIG. 5 is a plan view of a display device with multiple images overlaying a footprint of a pyramidal arrangement of reflectors.

Responsive to placement of images on the screen of display device 32, particular individual images can be reflected on each of the plurality of reflectors 36A-D. FIG. 5 is a top view looking through the display device 32 onto the reflectors 36A-D. The phantom lines indicate the approximate regions of the display screen that will be reflected on the respective reflectors. It will be recognized that the dimensions and configuration of the reflectors may result in a different division of the display screen. For example, a three-sided pyramid would require a different image configuration in order to present distinct images on respective reflectors. Similarly, a larger or smaller pyramid may require an altered image arrangement. Also, the display screen(s) may be skewed with respect to the reflectors (e.g., the sides of the pyramid may not be parallel to the sides of the display screens).

Figure 6:
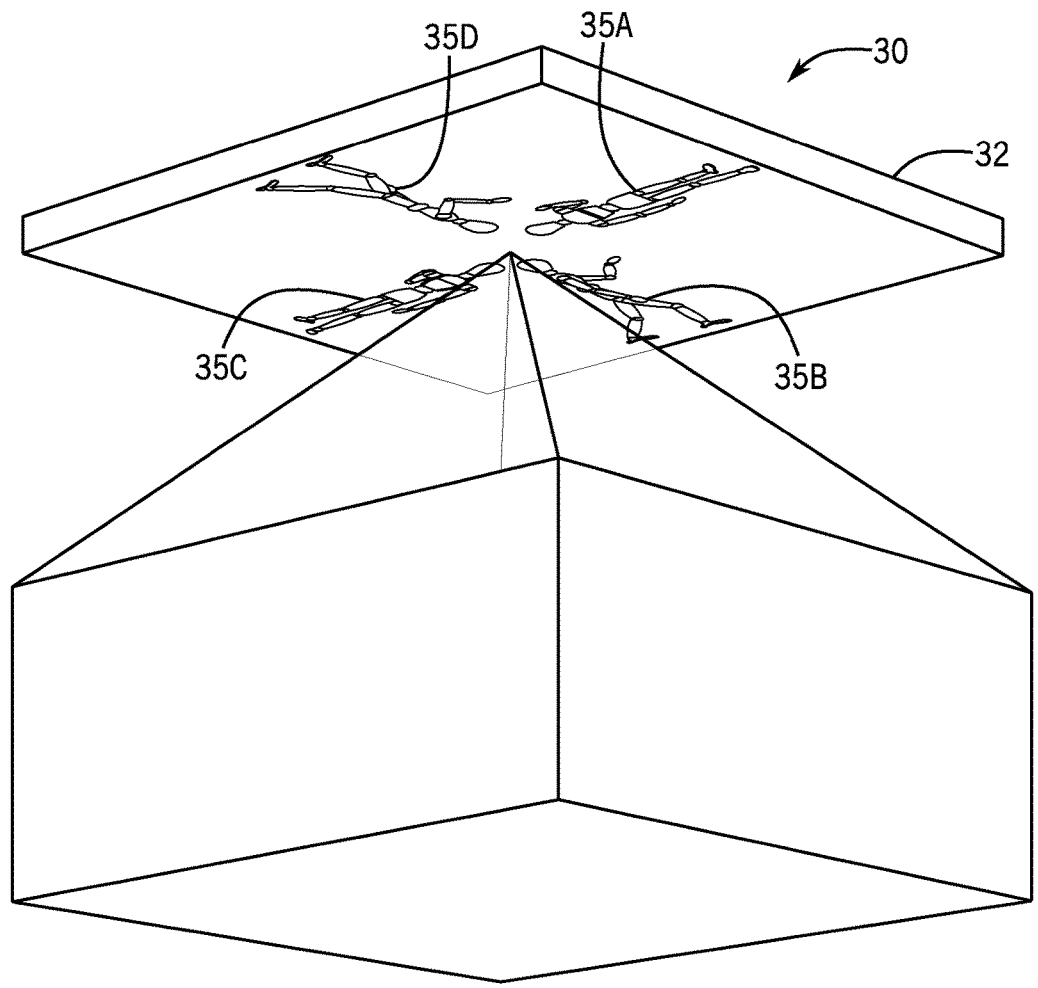
FIG. 6 is a perspective view of a reflective display assembly with a downward-facing display device according to an embodiment of the present invention.

Referring now to FIG. 6, an embodiment of the gaming machine 100 utilizes the reflective display assembly 30 to create a pseudo-holographic effect for players and bystanders around the gaming machine 10. The display device 32 displays an image comprising individual views 35A-D of an object (or virtual object) from different viewpoints. The individual views 35A-D are positioned on the display screen so that each view is reflected on a respective reflector 36A-D. In an embodiment, the individual views may be derived from virtual cameras positioned at different viewpoints around a 3D game object in a virtual environment. For example, the 3D game object 34 of FIG. 4 is depicted on the display device 32 from four different viewpoints 35A-D, representing a left view, back view, right view, and front view, respectively. In the configuration shown, the viewpoints 35A-D will be reflected in reflectors 36A-D, respectively, and this provides players at particular positions around the reflective display assembly 30 (e.g., left, back, right, or front) with views of the 3D game object that simultaneously correspond with each position.

Figure 7:
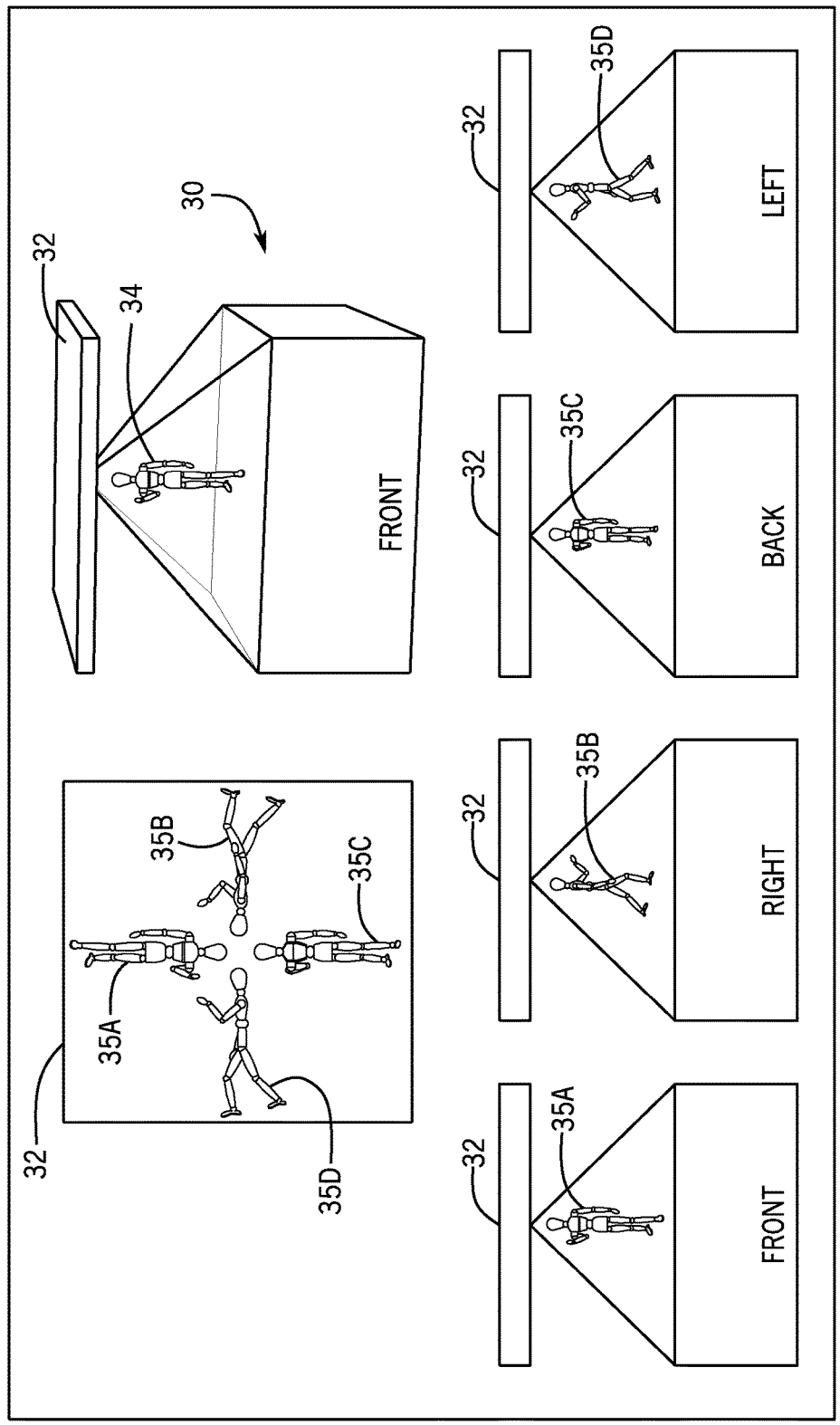
FIG. 7 depicts views of a reflective display assembly and the reflected images seen from specific positions around the display assembly, according to an embodiment of the present invention.

FIG. 7 presents a tableau of views that illustrate how the individual images shown on the display device are reflected in respective reflectors of the assembly. In the top row are shown a view of the display device 32 with four individual images of a 3D game object 34 (human figure) and also a perspective view of a pyramidal reflective display assembly presenting the 3D game object 34. In the bottom row are separate views of each side of the reflective display assembly 30 including, respectively, a front, right, back and left side. Each side view demonstrates the different viewpoint of the 3D game object 34 that corresponds with the particular side. As shown, players at front side, for example, see the 3D game object 34 from the viewpoint of a virtual camera designated as the front camera and players at the other sides simultaneously see the 3D game object 34 from their respective corresponding viewpoints. Since the 3D game object 34 is effectively unitary (i.e., all of a piece, whether virtual or actual), any movements by the 3D game object 34 will be accurately reflected in all the different viewpoints in "real time" and the players will experience the display effect accordingly.

Audio Characteristics and Focus Direction

The current invention may be implemented with a multiplayer game presentation such as the abovedescribed 3D game object displayed by the reflective display assembly 30. The invention complementarily provides individualized audio output that may be effectively correlated with the multiple positions disposed around the reflective display assembly 30. Just as the reflective display assembly presents positionally accurate visual images at the respective positions around the reflective display assembly, the invention produces varying audio outputs at the respective positions having characteristics that reproduce realistic (or hyper-realistic) audio variations that would be experienced by listeners at the different positions. In this way, the invention augments the visual presentation of the multi-player game.

The 3D game object displays various behaviors during play of the game that are responsive to events in the game. In an embodiment, the 3D game object may be a virtual dealer (either anthropomorphic or not) that deals cards to players at respective positions—turning to face (or address) each position in turn. These "dealing" behaviors may each include a corresponding focus direction synchronized with the respective behavior. When dealing cards to a player at the front of the reflective display assembly (i.e., at the FRONT position), the focus direction is toward the FRONT position. As dealing proceeds to subsequent players at different positions, the focus direction of the 3D game object may shift to each successive position—when dealing to the RIGHT position the focus direction moves to the RIGHT position, when dealing to the BACK position the focus direction moves to the BACK position, and so on.

In an embodiment, when the 3D game object focuses on a particular position, the sound system may output audio that is specifically configured to be indicative of sounds perceived at the focus position. In the real world, sounds have aural qualities related to characteristics like frequency range, echo, and reverberation, sometimes characterized as "timbre" or "tone," that can provide cues to a listener as to location, direction, and even surroundings associated with a sound source. Certainly, the most obvious quality is volume. Louder sounds are interpreted as originating nearby and softer sounds are thought to be from further away. The current invention focuses on sound qualities other than volume which may be equally suggestive of location, direction, and surrounding of a sound source. These qualities are sometimes described as light or dark, live or dead, wet or dry, bright, boomy, warm, etc. Some of these qualities change in predictable and recognizable ways responsive to behavior (such as movements) of a sound source.

A sound quality (such as "brightness") may be a result of a plurality of identifiable characteristics as well as some contributions that are unknown or only vaguely understood. Nonetheless the quality may be manipulated by changes to known characteristics such that a listener will "recognize" the distinctions. For example, when a person speaks directly to another (i.e., face-to-face), the sound waves travel a short and relatively direct path from the speaker's mouth to the listener's ears. In this scenario, the high frequency sounds are fresh and crisp (the sound is "bright") to the listener. When the speaker turns 180 degrees and speaks, the sound waves may still reach the listener but the extra distance traveled as well as any reflected sounds from the environment will affect the qualities of the sound. High frequencies attenuate and may be absorbed by elements of the environment so that the sound heard by the listener is less "bright." The reduction of high frequencies in indirect sounds is sometimes called "roll-off" and is a recognizable result of indirect sound projection.

Recorded sounds (and computer-generated sounds) can be artificially processed using audio equipment to mimic changes caused by physical conditions. So, a recorded voice can be altered using, for example, a frequency-filtering device to reduce the high frequency sound waves present in the recorded sound to imitate the effects of a change in direction of a sound source. A savvy listener may hear the change in frequency response and ascribe that change to a change in direction of the sound projection. When the audio is paired with a visual image of a person speaking first face-to-face and then turning away, the listener almost immediately connects the change in sound quality to the directional change. In this way, the sound quality augments the visual imagery.

In an embodiment of the invention, audio output at a particular position has audio characteristics that depict the visual imagery presented on the reflective display assembly at that particular position. For example, returning to the previous discussion regarding 3D game object behavior having a focus direction, when a virtual dealer is dealing cards to a first one of the multiple positions disposed around the reflective display assembly (i.e., the behavior is focused toward that particular position), the sound system may output audio with a "brighter" quality, that is, with an abundance of high frequency sounds, to mirror the visually displayed experience of direct interaction between a player at the first position and the virtual dealer. When the virtual dealer is interacting with a player at different position (i.e., the behavior is no longer focused toward the first position) the sound system may output "darker" audio to the first position to indicate the sound source is directed away from the first position. Other sound characteristics may be useful in depicting different positional, directional and environmental conditions. For example, more or less reverberation may be interpreted as indicative of a direct or indirect sound path, respectively. Additionally, reverberation ("reverb") is often indicative of a sound source located in a large, cavernous enclosure. By pairing increased reverb with a visibly shrinking 3D game object, the sense of diminishing size and increasing distance from the sound source can be significantly enhanced.

There are many audio characteristics that may be intentionally altered using audio-processing circuitry. In addition to the previously mentioned reverberation and frequency equalization parameters, sounds may be altered by pitch shifting and time stretching, by adding echo or reverse echo, by emphasizing or adding harmonics to certain frequencies, by synthesizing artificial sounds, etc. Additionally, sound content may be added or removed to create certain effects.

Audio characteristics may be manipulated in various ways, including via processing existing sound files and generating new sound files. The processing/generation may be achieved using either digital technology or analog technology or a combination of both. Audio files may be recorded using convention studio equipment and techniques. Digital audio may generated dynamically ("on-the-fly") using a library of stored sound clips. Both digital and analog audio may be processed using algorithm-driven computer-executable instructions.

In an embodiment, audio may be processed using frequency-filtering techniques to eliminate high frequency sounds (e.g., high-pass filters) or to eliminate low frequency sounds (e.g., low-pass filters). Similar effects may be realized by increasing the high frequency response characteristics of an audio file as by decreasing the low frequency response characteristics of the audio file—in both cases the ratio of high frequency sounds to low frequency sounds is increased. In this way, audio may be manipulated in various way to produce a desired effect. Additionally, it is noted that precise "realism" is not necessarily the goal of the above-mentioned audio characteristic manipulation. Audio may be manipulated in various "unrealistic" ways in order to produce a desired effect on a listener. For example, actual changes in reverberation resulting from changing the direction of a sound source may be barely noticeable in the "real world," however, an overlarge increase in reverberation in an audio file may draw out the desired response from a listener. That is to say, in an embodiment of the invention, the goal is to provide sufficient audio cues to suggest an event in the real world, and the necessary stimulus to achieve the effect may be far greater than any realistic presentation.

The nature of the audio may vary depending on the game, the 3D game object, one or more particular events in the game, one or more different 3D game object behaviors, and other criteria and combinations thereof. In an embodiment, the principal audio (i.e., the audio output at the focus position) may include spoken words and the subordinate audio may include miscellaneous game sounds (e.g., shuffling cards, slot machine sound effects, music, applause, etc.) In an embodiment, the principal audio may comprise non-verbal communications such as whistles, taps, grunts, etc. In an embodiment, subordinate audio may include some or all of the principal audio but with modified sound characteristics depicting increased distance from the sound source or from the focus direction.

Principal audio may comprise raw (unprocessed) audio content and subordinate audio may comprise the principal audio content with secondary processing to generate desired sound characteristics. For example, principal audio may be a recorded sound file with no artificially enhanced characteristics (i.e., a "dry" recording) and corresponding subordinate audio may be generated by filtering the high frequency sounds from the dry recording and adding reverb to the filtered audio to simulate a distant or indirect sound source—generally altering the ratio of high frequency sounds to low frequency sounds. Alternatively, subordinate audio may comprise a dry recording and principal audio may comprise processed subordinate audio, or both principal and subordinate audio may be processed to create desired sound qualities. In an embodiment, either or both of principal and subordinate audio may be computer-generated instead of recorded, or may include both recorded and computer-generated elements.

Figure 8:
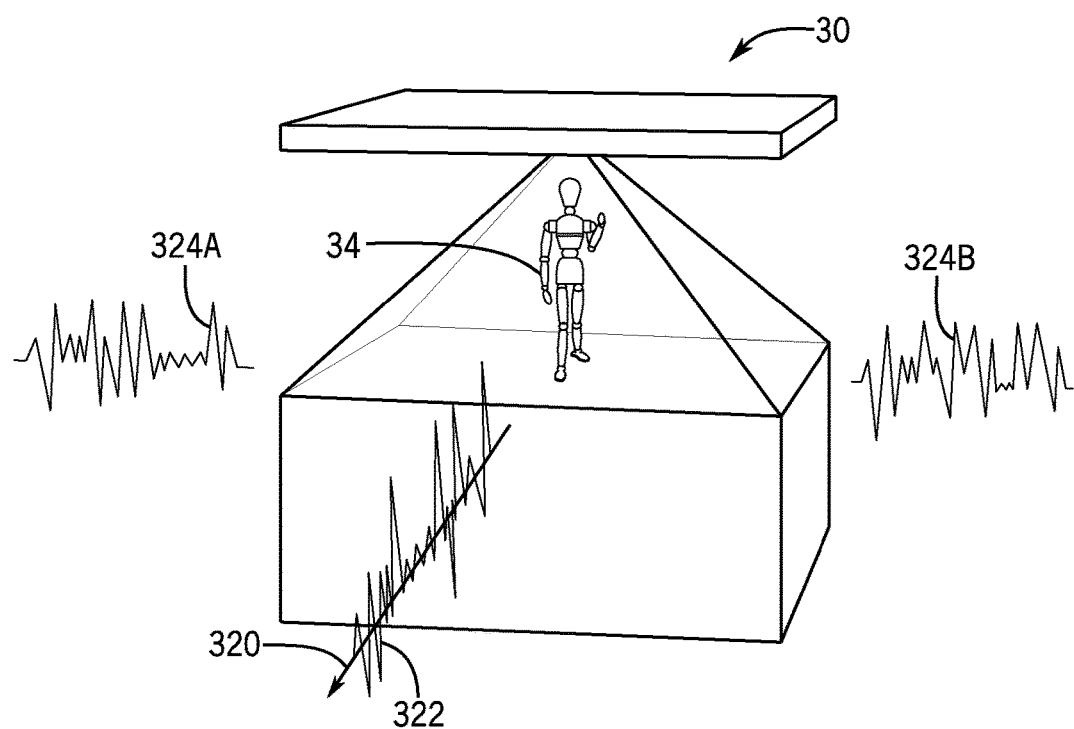
FIG. 8 is a perspective view of a reflective display assembly displaying 3D game object behavior with a first focus direction, and includes visual representations of principal audio proximal the first focus direction and subordinate audio distal the first focus direction being output at various positions around the reflective display assembly.

FIG. 8 depicts a perspective view of the reflective display assembly 30 including representations of audio outputs tailored to the respective different viewpoints of the 3D game object 34. In an embodiment, 3D game object 34 executes game-related behavior having a first focus direction 320. For example, a dealer dealing cards to a front position has a first focus direction corresponding to the front position. In the embodiment of FIG. 8, principal audio 322 is output by the audio-processing circuitry at the front position. The principal audio has characteristics, either as a result of its original recording conditions or resulting from secondary processing, that depicts proximity (i.e., nearness) to the first focus direction. While the 3d game object behavior is focused on the front position, supplementary audio 324A-B that has characteristics that depict distality (i.e., remoteness) with the first focus direction is output at the two side positions.

Figure 9:
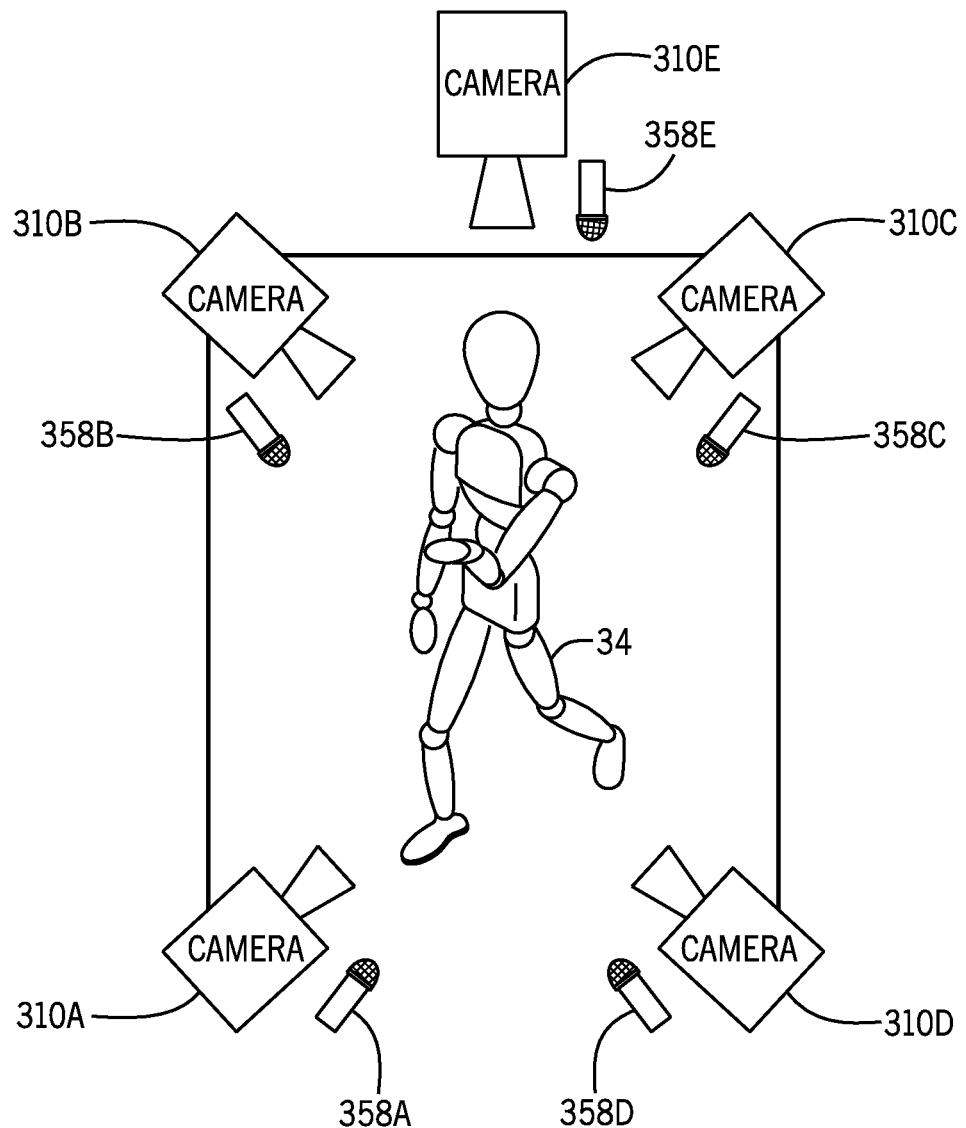
FIG. 9 is an image of a virtual 3D game object in computer-space with multiple virtual cameras and multiple virtual microphones positioned at different viewpoints.

Referring now to FIG. 9, there is depicted the 3D game object 34 in a virtual 3D environment, such as may be created using a computer-aided design software application like SolidWorks®, Blender, Maya®, Modo®, etc. The 3D game object 34 is surrounded in the 3D environment by virtual cameras 310A-E that capture video images of the 3D game object 34 from different viewpoints (e.g., left, back, right, front, overhead). In the embodiment shown in FIG. 6, the video images captured by each virtual camera 310A-D are displayed as individual viewpoints 35A-D, respectively, on the display device 32 and reflected in the corresponding reflectors 36A-D. More or less cameras may be utilized to provide different viewpoints to players and/or observers. For example, in an embodiment, an overhead camera 310E may capture a "bird's eye" view of the 3D game object 34.

Also shown in FIG. 9 are virtual microphones 358A-E which are envisioned to be integrated with a 3D object-viewing application and a sound system according to an embodiment of the invention. As the 3D game object 34 performs game-related behaviors as part of the game, the audio-processing circuitry prepares principal and subordinate audio responsive to the behaviors and outputs the audio to respective positions around the reflective display device. The audio-processing may be controlled by algorithmic instructions or may select and execute stored audio files corresponding to particular behaviors. The resulting principal and subordinate audio depicts appropriate sound qualities depending on location, position and surroundings displayed to players and observers of the gaming machine 10.

Figure 10:
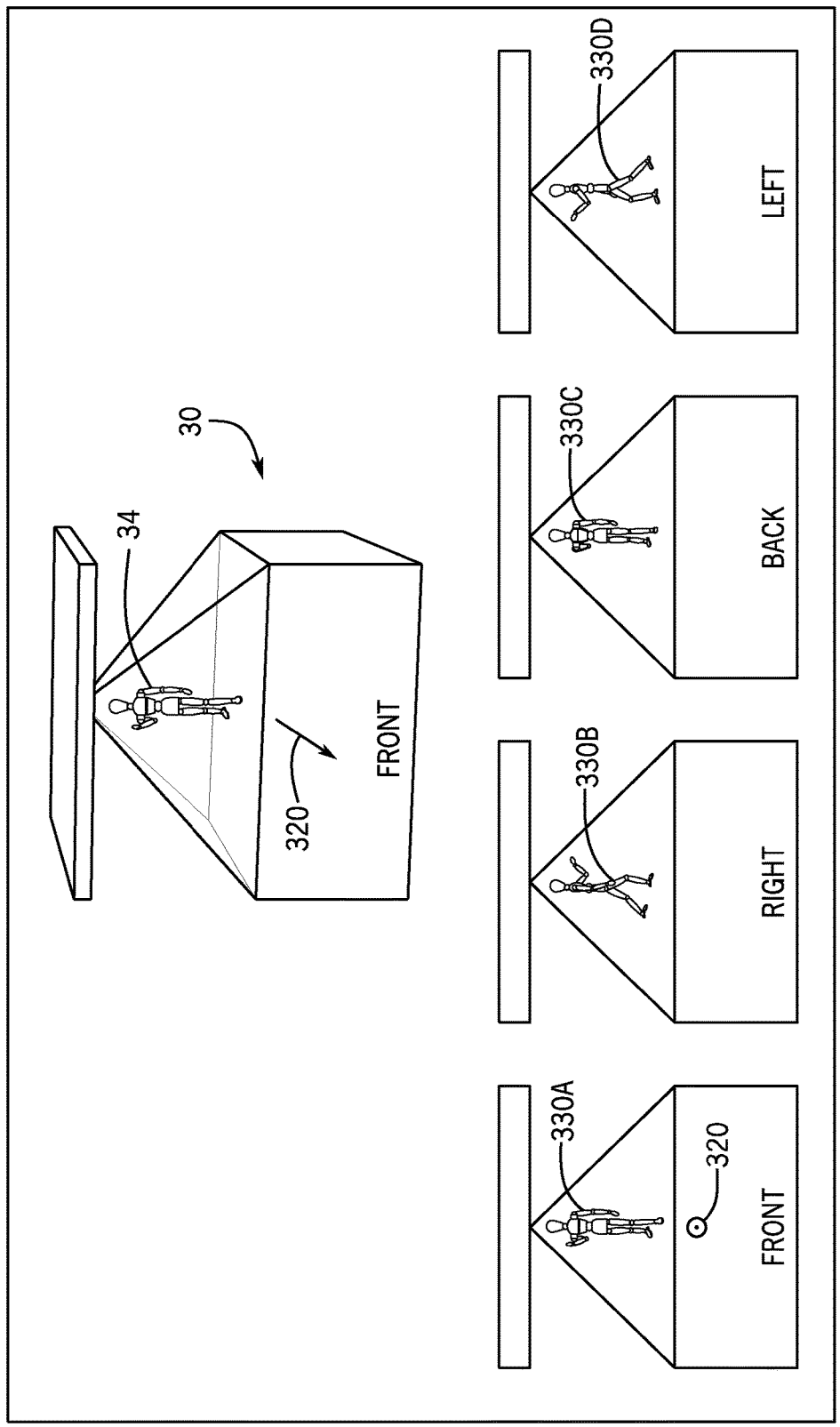
FIG. 10 depicts views of a reflective display assembly displaying 3D game object behavior with a first focus direction and the reflected images seen from specific positions around the display assembly, according to an embodiment of the present invention.

Referring now to FIG. 10, a tableaux of images demonstrate an embodiment of the invention including a reflective display assembly 30 displaying images of a 3D game object 34 from different viewpoints at respective positions disposed about the reflective display assembly 30. The top image shows a perspective view of the reflective display assembly 30 in which the 3D game object 34 is displaying behavior with a first focus direction 320 toward the FRONT position. With the first focus direction 320 at the FRONT position, principal audio will be output at the FRONT position with sound characteristics depicting proximity of the FRONT position to the first focus direction 320. The bottom images indicate the different views reflected to each position, FRONT-RIGHT-BACK-LEFT, disposed about the reflective display assembly 30. As in the perspective view of the top image, the first focus direction 320 is indicated at the FRONT position.

Figure 11:
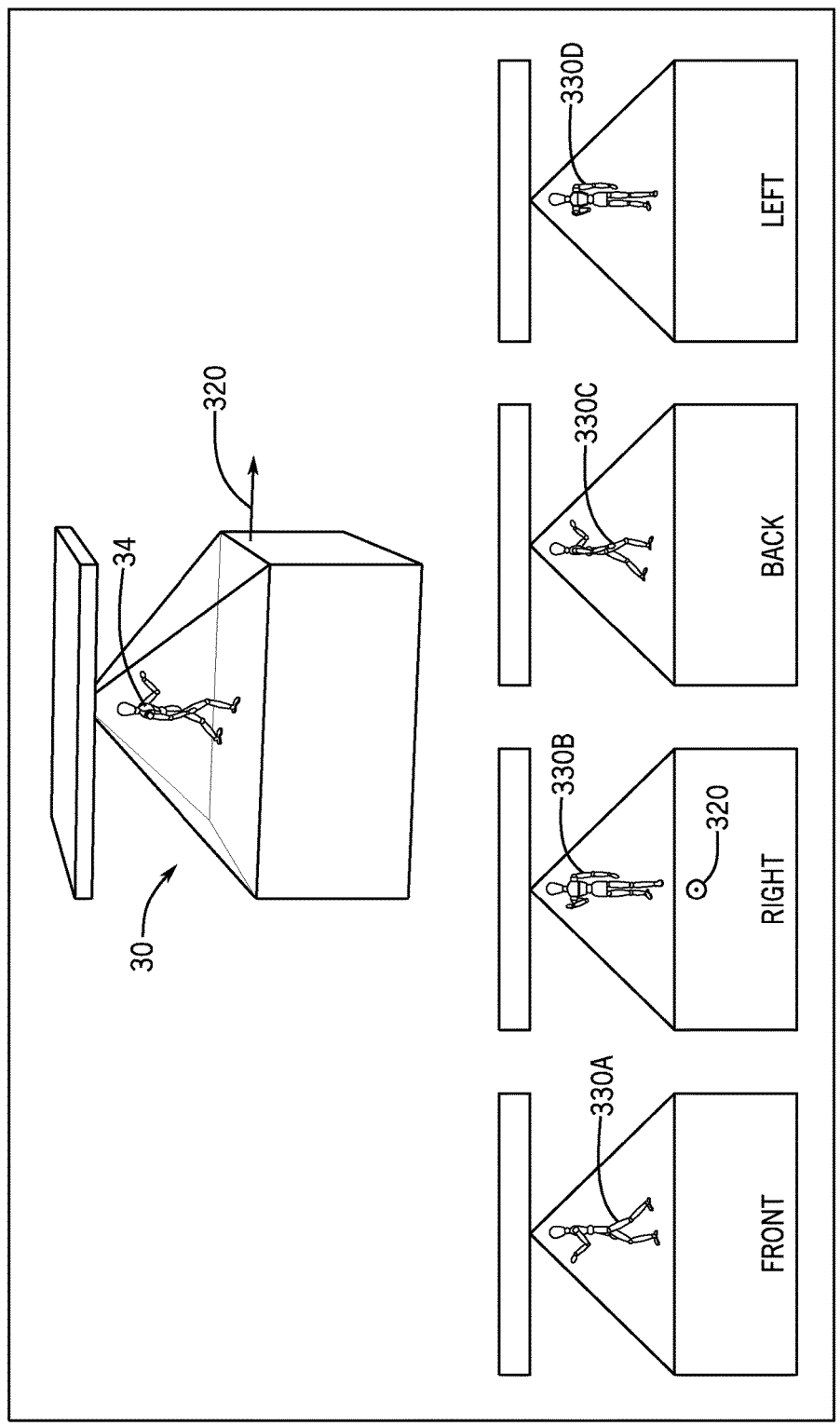
FIG. 11 depicts views of the reflective display assembly of FIG. 10 after the 3D game object behavior (and the first focus direction) has shifted to a different position, according to an embodiment of the present invention.

In FIG. 11, a tableaux of images depicts the embodiment of FIG. 10 after the 3D game object has turned to interact with a player at the RIGHT position of the reflective display assembly 30 causing the first focus direction 320 to also shift to the RIGHT position. In response to the shifting focus of the behavior, the principal audio is redirected from the FRONT position to the RIGHT position. The bottom images indicate the new views of the 3D game object 34 and appropriately indicate the first focus direction 320 at the RIGHT position. It should be recognized that embodiments of the invention may have various numbers of discrete positions beyond the FRONT-RIGHT-BACK-LEFT shown in FIGS. 10 and 11. For example, considering the gaming machine 100 shown in FIG. 3, it is seen that three separate player stations 14B-D are included in one position around the reflective display assembly. It is envisioned that this embodiment might include distinct FRONT(right)-FRONT (center)-FRONT(left) positions and each position could correspond with a separate focus direction. It is envisioned that sound systems with various levels of resolution may be employed and these are considered to be within the scope of the aspects of the invention.

It is also envisioned that an embodiment may comprise multiple "principal" audio outputs directed simultaneously to different focus directions. For example, while the 3D game object is interacting with a player at the FRONT position, audio content with characteristics similar or identical to audio output at the FRONT position may be output at a RIGHT position in the form of a whispered "aside" commentary, alert, or observation (e.g., "He's got a potential straight.") In this way, additional interactions can be conducted concurrently with the primary focus as a way to capture players' attention and sustain their interest in the game-play.

One having skill in electronic display art will recognize further configuration and control variations that may be adapted for use in a reflective display assembly and such variations are considered to be within the scope and spirit of the invention.

Figure 12:
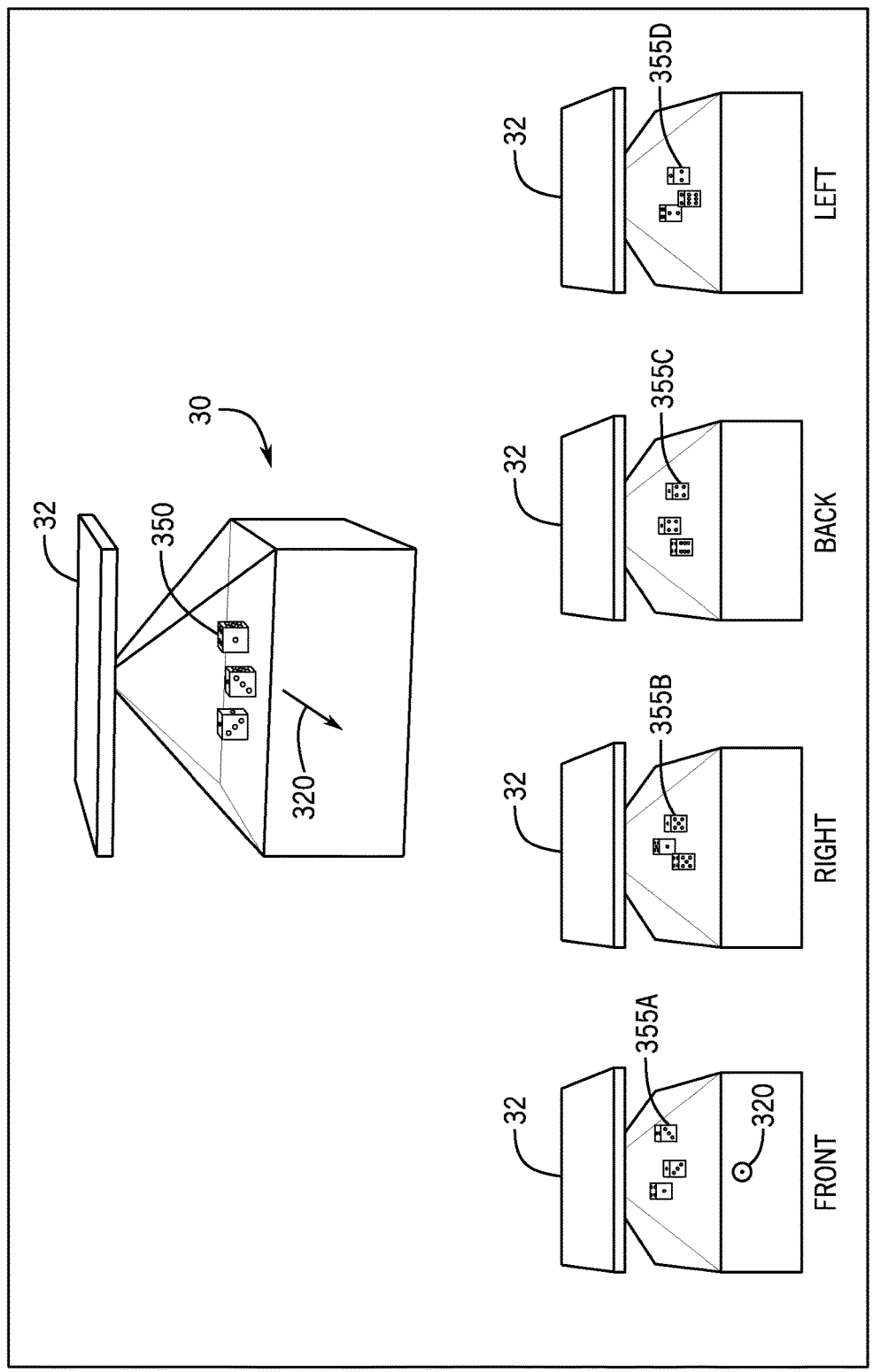
FIG. 12 depicts views of a reflective display assembly displaying 3D game object behavior with a first focus direction and the reflected images seen from specific positions around the display assembly, according to another embodiment of the present invention.

In yet another embodiment, the 3D game object may be a dice cup containing some dice. FIG. 12 is a tableau of views of an embodiment of a reflective display assembly presenting a pair of dice 350 as a 3D game object. In the upper left view, the dice are shown in free-fall as if just tossed into the display assembly. The upper right view shows the dice at rest on the floor of the display assembly. The first focus direction 320 indicates the dice roll corresponds to a player at the FRONT position. The lower views depict the dice as seen from various positions (FRONT-RIGHT-BACK-LEFT) around the reflective display assembly, and the different viewpoints 355A-D depict relative positions and exposed faces of the dice that correspond to the respective positions. Various other 3D game objects may be envisioned and are considered to be within the scope and intent of the invention.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The foregoing description, for purposes of explanation, uses specific nomenclature and formula to provide a thorough understanding of the disclosed embodiments. It should be apparent to those of skill in the art that the specific details are not required in order to practice the disclosed embodiments. The embodiments have been chosen and described to best explain the principles of the invention and its practical application, thereby enabling others of skill in the art to utilize the invention, and various embodiments with various modifications as are suited to the particular use contemplated. Thus, the foregoing disclosure is not intended to be exhaustive or to limit the invention to the precise forms disclosed, and those of skill in the art recognize that many modifications and variations are possible in view of the above teachings.

What is claimed is:

1. A gaming system configured to present audio supplementing a reflective display assembly reflecting images of a 3D game object simultaneously to multiple positions disposed around the reflective display assembly, the 3D game object displaying various behaviors responsive to game events, the behaviors having respective focus directions with respect to the multiple positions, the gaming system comprising:
   a plurality of audio output devices;
   audio-processing circuitry configured to, in response to the 3D game object behavior having a first focus direction:
      output, through one or more of the plurality of audio output devices, principal audio with principal audio characteristics to a first position of the multiple positions, the first position being proximal the first focus direction, the principal audio characteristics indicating that the first position is proximal to the first focus direction,
      output, through one or more of the plurality of audio output devices, subordinate audio with subordinate audio characteristics to a second position of the multiple positions, the second position being distal the first focus direction, the subordinate audio characteristics indicating that the second position is distal to the first focus direction.

2. The gaming system of claim 1, wherein the audio-processing circuitry is further configured to, in response to the 3D game object behavior shifting from the first focus direction to a second focus direction corresponding to the second position, redirect the principal audio to the second position.

3. The gaming system of claim 1, wherein the audio-processing circuitry is further configured to, in response to the 3D game object behavior shifting from a first focus direction to a second focus direction corresponding to the second position:
   change the subordinate audio characteristics to indicate that the second position is proximal to the second focus direction, and
   change the principal audio characteristics to indicate that the first position is distal to the second focus direction.

4. The gaming system of claim 1, wherein the 3D game object is a virtual dealer of a card game and the 3D game object behaviors include dealing cards to respective positions of the multiple positions, wherein, in response to the virtual dealer dealing cards to the first position, the first focus direction corresponds with the first position and, in response to the virtual dealer shifting to deal cards to the second position, the audio-processing circuitry redirects the principal audio to the second position.

5. The gaming system of claim 1, wherein the principal audio characteristics are processed to increase a ratio of high frequencies to low frequencies.

6. The gaming system of claim 1, wherein the subordinate audio characteristics include more reverb than the principal audio characteristics.

7. The gaming system of claim 1, wherein the subordinate audio characteristics are processed to reduce the ratio of high frequencies to low frequencies.

8. The gaming system of claim 1, wherein the principal audio includes different audio content than the subordinate audio.

9. The gaming system of claim 1, wherein the 3D game object may be depicted at different distances with respect to the multiple positions, and wherein the audio-processing circuitry is further configured to, in response to the 3D game object being depicted at a first distance from the first position, output the principal audio with first distance audio characteristics that indicate the first distance and, in response to the 3D game object being depicted at a second, different distance from the first position, output the principal audio with second distance audio characteristics that indicate the second distance.

10. The gaming system of claim 9, wherein the first distance is less than the second distance, and the first distance audio characteristics include a higher ratio of high frequencies to low frequencies than the second distance audio characteristics.

11. The gaming system of claim 9, wherein the first distance is greater than the second distance, and the first distance audio characteristics include more reverb and a lower ratio of high frequencies to low frequencies than the second distance audio characteristics.

12. The gaming system of claim 1, wherein the 3D game object comprises a pair of dice and the 3D game object behaviors include moving the pair of dice to respective positions of the multiple positions, wherein, in response to the pair of dice being closest to the first position, the first focus direction corresponds with the first position and, in response to the pair of dice moving to be closest to the second position, the audio-processing circuitry redirects the principal audio to the second position.

13. A method of supplementing a reflective display assembly with audio, the reflective display assembly displaying images of a 3D game object simultaneously to multiple positions disposed around the reflective display assembly, the 3D game object displaying varying behaviors responsive to game events, the varying behaviors having respective focus directions with respect to the multiple positions, the method comprising:

in response to the 3D game object behavior having a first focus direction:
outputting, via audio-processing circuitry through an audio system, first position audio with first position audio characteristics at a first position of the multiple positions, the first position being proximal the first focus direction, the first position audio characteristics indicating that the first position is proximal to the first focus direction; and
outputting, via the audio-processing circuitry through the audio system, second position audio with second position audio characteristics at a second position of the multiple positions, the second position being distal the first focus direction, the second position audio characteristics indicating that the second position is distal to the first focus direction;

in response to the 3D game object behavior shifting from the first focus direction to a second focus direction:
adjusting the second position audio such that the second position audio characteristics indicate that the second position is proximal to the second focus direction, and
adjusting the first position audio such that the first position audio characteristics indicate that the first position is distal to second focus direction.

14. The method of claim 13, wherein the first and second focus directions are responsive to an apparent interaction between the 3D game object and one or more players at a respective position of the multiple positions.

15. The method of claim 13, further comprising outputting, via the audio-processing circuitry through one or more audio speakers, ambient audio at all of the multiple positions.

16. The method of claim 15, wherein the ambient audio comprises one or more of applause, cheering, conversation, and celebration sounds associated with a prototypical casino environment.

17. A method of supplementing a reflective display assembly with audio, the reflective display assembly displaying images of a 3D game object apparently interacting with players at multiple positions disposed around the reflective display assembly, the method comprising, in response to the 3D game object interacting with a player at a first position of the multiple positions:

outputting, via audio-processing circuitry through an audio system, principal audio with principal audio characteristics at the first position, the principal audio characteristics indicating the interaction; and
outputting, via the audio-processing circuitry through the audio system, subordinate audio with subordinate audio characteristics at a second position of the multiple positions, the subordinate audio characteristics indicating non-interaction between the 3D game object and a player at the second position.

18. The method of claim 17, further comprising outputting additional, different audio at the second position, the additional audio including an audible alert related to the 3D game object interaction with the player at the first position.

19. The method of claim 18, wherein the audible alert comprises a spoken message to a player at the second position.

20. The method of claim 17, further comprising, in response to the 3D game object proceeding to interact with a player at the second position:
change the subordinate audio characteristics to indicate the interaction between the 3D game object with the player at the second position, and
change the principal audio characteristics to indicate non-interaction between the 3D object and the player at the first position.

* * * * *